United States Patent
van Kessel et al.

(10) Patent No.: US 6,644,222 B1
(45) Date of Patent: Nov. 11, 2003

(54) SYSTEM FOR CONTINUOUS THERMAL COMBUSTION OF MATTER, SUCH AS WASTE

(75) Inventors: Lambertus Bernardus Maria van Kessel, Apeldoorn (NL); Martijn Leskens, Apeldoorn (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 10/089,738
(22) PCT Filed: Oct. 4, 2000
(86) PCT No.: PCT/NL00/00714
§ 371 (c)(1), (2), (4) Date: Aug. 5, 2002
(87) PCT Pub. No.: WO01/25691
PCT Pub. Date: Apr. 12, 2001

(30) Foreign Application Priority Data

Oct. 4, 1999 (NL) .............................................. 1013210

(51) Int. Cl.⁷ .............................. F23N 5/00; F23N 5/18
(52) U.S. Cl. ...................... 110/185; 110/186; 110/188
(58) Field of Search ................................ 110/346, 189, 110/190, 193, 185, 186, 188

(56) References Cited

U.S. PATENT DOCUMENTS

| | | | | |
|---|---|---|---|---|
| 4,279,208 A | * | 7/1981 | Guillaume et al. | 110/346 |
| 4,592,289 A | * | 6/1986 | Pershing et al. | 110/345 |
| 4,986,198 A | * | 1/1991 | Naito et al. | 110/346 |
| 5,117,771 A | * | 6/1992 | Summers | 110/346 |
| 5,230,293 A | | 7/1993 | Schirmer | |
| 5,390,611 A | * | 2/1995 | John | 110/165 A |
| 5,520,123 A | * | 5/1996 | Chappell et al. | 110/188 |
| 6,190,160 B1 | * | 2/2001 | Hibon et al. | 431/2 |

FOREIGN PATENT DOCUMENTS

JP            55099514        7/1980

OTHER PUBLICATIONS

International Search Report, PCT/NL 00/00714 dated Jan. 19, 2001.

* cited by examiner

Primary Examiner—Ira S. Lazarus
Assistant Examiner—K. B. Rinehart
(74) Attorney, Agent, or Firm—Hoffmann & Baron, LLP

(57) ABSTRACT

The system for continuous thermal combustion of matter, such as waste, comprises an incinerator, air supply means for supplying heated air to the incinerator, and a steam generator for generating steam on the basis of heat generated in the incinerator. The system further comprising a controller which generates at least one control signal for setting the magnitude of a supply stream of the amount of material to the incinerator and/or for setting the amount of air which is supplied to the incinerator by means of the air supply means. The controller controls the at least one control signal, such that by the steam generator an amount of steam per unit time is generated which is equal to a first value and/or that by the air supply means so much air is supplied that an amount of oxygen is present in the incinerator which is equal to a second value. The system further comprises at least one protective circuit which lowers the first value or the second value when the at least one control signal exceeds a predetermined maximum value.

6 Claims, 2 Drawing Sheets

SYSTEM FOR CONTINUOUS THERMAL COMBUSTION OF MATTER, SUCH AS WASTE

This application is the U.S. National Phase of International Application Number PCT/NL00/00714 filed on Oct. 4, 2000, which is incorporated herein by reference.

BACKGROUND OF THE INVENTION

The invention relates to a system for continuous thermal combustion of matter, such as waste.

SUMMARY OF THE INVENTION

This invention relates to a system for continuous thermal combustion of matter such as waste, comprising an incinerator including an inlet for supplying matter to be combusted, an outlet for discharging. combusted matter, a combustion path extending between the inlet and the outlet and along which, in use, by means of conveying means the matter is continuously passed in a conveying direction from the inlet to the outlet for combustion of the matter, and air supply means for supplying optionally heated air to the combustion path, the system further comprising an energy. generator for generating energy in the form of, for instance, steam or electricity on the basis of heat generated in the incinerator, and control means which, depending on the amount of energy generated by the generator, and/or the amount of oxygen in the incinerator, generates at least one control signal for at least setting the amount of matter which is supplied to the incinerator and/or the speed at which the matter is conveyed in the conveying direction through the incinerator, and/or the amount of air which is supplied to the incinerator by means of the air supply means, the control means controlling the at least one control signal such that by the energy generator an amount of energy per unit time is generated which is at least equal to a first value and/or that an amount of oxygen is present in the incinerator which is at most equal to a second value. Such a system is known per se. One of the problems occurring in waste incineration concerns the fluctuations in the process that are caused by the continuously changing waste composition. Strong fluctuations in the waste composition, and hence in the energetic power supplied, can result in strong process fluctuations, such as fluctuations in the temperature of the incinerator. Such process fluctuations can be detrimental to the system. Also, the process fluctuations can entail product fluctuations, such as fluctuations in the amount of generated energy in the form of generated steam and electricity. As a result of this, the yield and quality of these products are lowered. In the known systems, in an attempt to provide a solution to the problems outlined, the control means is employed, which generate the at least one control signal for setting the amount of matter that is supplied to the incinerator and the conveying speed of the matter through the incinerator and/or for setting the amount of air that is supplied to the incinerator by means of the air supply means. The control means control the at least one control signal, such that the fluctuations referred to are damped. One of the problems in turn caused by the control means is that they cannot adequately deal with protractedly low values of the heating value of the waste. If, for instance, the heating value decreases strongly, the amount of energy that is generated will likewise decrease. Also, less oxygen will be consumed, so that the amount of oxygen in the incinerator increases. As a result of these prolonged deviations, the control means, in an attempt to compensate these deviations in energy and/or oxygen, will increase the amount of matter that is supplied to the incinerator, raise the conveying speed of the matter through the incinerator and/or reduce the amount of air that is supplied to the incinerator. However, if the energy production decreases and/or the amount of oxygen in the incinerator increases, for instance due to the matter supplied being wet, the control means lead to still more wet matter being supplied, with the result that the still larger amount of wet matter leads to the combustion of the matter proceeding slower still, so that still less energy is generated and the amount of oxygen in the incinerator rises further. It is also possible that the control means then cause less air to be supplied to the incinerator, since an excess of oxygen is found to be present in the incinerator. The supply of less air, which is generally heated, in turn can also lead to a decrease of the combustion. In response, the control means can result again in more matter being supplied to the incinerator and/or less air being supplied to the incinerator. Eventually, the incinerator may go out as a result of excessive supply of matter to the incinerator and/or insufficient supply of optionally heated air to the incinerator. The object of the invention is to provide a solution to this problem.

To that end, the system according to the invention is characterized in that the system further comprises at least one protective device which lowers the first value or the second value and/or raises the second value when the at least one control signal exceeds a predetermined maximum value.

The protective device according to the invention therefore has as a consequence that the at least one control signal is limited upwards to prevent the full power drive of the at least one control signal. This is achieved by lowering, or raising, the first and/or second value, with the result that the control means are adjusted such that the control means presently strive for a reduced energy production and/or admit an increased amount of oxygen to the incinerator. In practice, this means that when the composition of the matter changes such that the heating value thereof decreases, it is not attempted to compensate a consequent lower energy production by an unlimited increase of the amount of matter that is supplied to the incinerator. In particular, what is also prevented is that, similarly, the amount of air that is supplied to the incinerator is reduced without limitation because an excess of oxygen appears to be present in the incinerator anyway. By virtue of the at least one protective device mentioned, the possibility of the incinerator thus going out is prevented.

Preferably, the protective device comprises an integrator which starts to integrate the difference between the at least one control signal and the predetermined maximum value in time from the moment that the value of the at least one control signal rises so as to become greater than the predetermined maximum value, the protective device being adapted for lowering the first value by a correction value whose magnitude depends on the magnitude of the output signal of the integrator, or for raising the second value by a correction value whose magnitude depends on the magnitude of the output signal of the integrator. In this case, the protective device therefore comprises an integrator which, as soon as the at least one output signal reaches the maximum value, is set into operation, such that the output of the integrator increases in time. The result of this is that the first value (the so-called setpoint imposed on the energy generator) decreases and/or that the second value (the setpoint imposed on the amount of oxygen in the incinerator) increases. The result of this, in turn, is that the magnitude of the at least one output signal of the control means decreases. In particular, further, the protective device is so arranged that when the magnitude of the control signal falls below the predetermined maximum value again while the correction value is not yet equal to zero, the integrating operation of the integrator is continued on the basis of the inverse of the difference between the magnitude of the value of the control signal and the magnitude of the predetermined maximum value until the correction value is equal to zero. This means that the magnitude of the output signal of the control means decreases just so long until it is less again than the maximum value mentioned. If that happens, and when moreover the correction value is not yet equal to zero, the sign of the input of the integrator will change with the result that the correction value will decrease. This in turn has as a consequence that the reduction of the first value will decrease, so that the protection will control the setpoint of the control means back to the original first value. Also the increase of the second value can decrease accordingly to the original second value. If this happens, the original situation has come about again. The protective device will now be set into operation again only when the output signal becomes equal to or greater than the predetermined maximum value.

In particular, only one protective device is present for lowering the first value. It has been found in practice that the use of a protective device for control means that control only the amount of energy suffices. Control means that control the amount of oxygen in the incinerator by controlling the amount of matter that is supplied to the incinerator, the conveying speed of the matter through the incinerator and/or the amount of air that is supplied to the incinerator do not always need to be provided with a protective device. However, this obviously does not exclude the possibility of employing both a protective device for the control means controlling on the basis of the amount of energy generated and a protective device for control means controlling only on the basis of the amount of oxygen in the incinerator. Also conceivable are control means that control the amount of matter that is supplied to the incinerator, the conveying speed of the matter through the incinerator and/or the air supply to the incinerator on the basis of a combination signal that is based on the amount of oxygen in the incinerator. In that case, too, one protective device for these control means can suffice. Naturally, it is also possible for a protective device to be employed only for air supply means.

BRIEF DESCRIPTION OF THE DRAWINGS

The invention will presently be further elucidated with reference to the drawing. In the drawing.

DETAILED DESCRIPTION OF THE PREFERRED EMBODIMENTS

Figure 1:
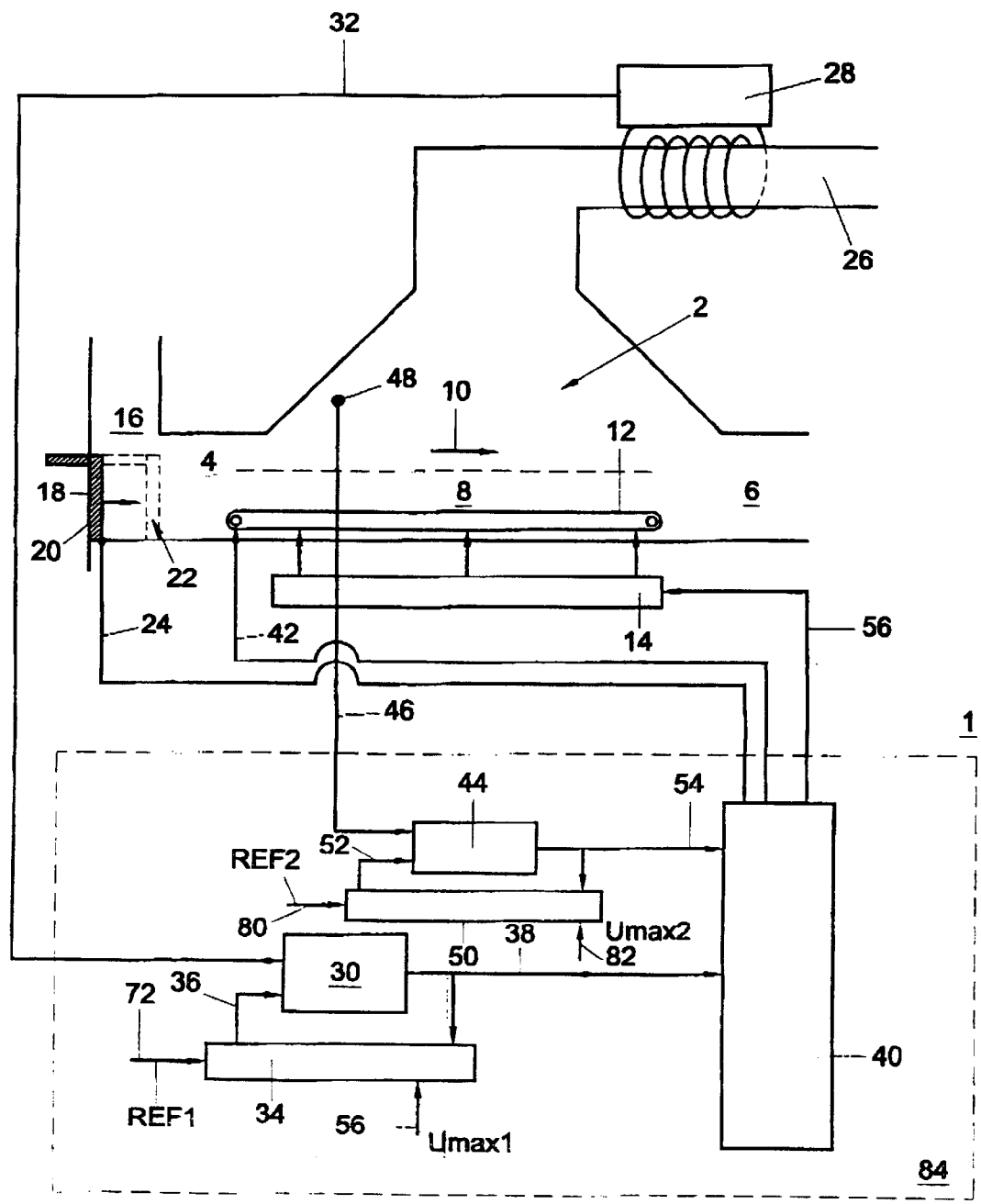
FIG. 1 shows a possible embodiment of a system according to the invention.

In FIG. 1 reference numeral 1 designates a possible embodiment of a system for continuous thermal combustion of matter, in this example waste. The system comprises an incinerator 2 including an inlet 4 for supplying the waste to be burnt, an outlet 6 for discharging the burnt waste, and a combustion path 8 extending between the inlet and the outlet and along which, in use, the matter is passed continuously in a conveying direction designated by the arrow 10. The conveying direction 10 is directed from the inlet to the outlet. The incinerator further comprises conveying means 12, which can consist, for instance, of a grid for conveying the waste in the conveying direction 10. Further, the system comprises air supply means 14 for supplying heated air to the combustion path 8. Upstream of the inlet, the incinerator is provided with a chute 16, in which the waste can be dumped. In the chute 16, further, a supply plate 18 is present which can reciprocate between a first position 20 and a second position 22, indicated in broken lines. If waste is contained in the chute, the supply plate can be moved, under the control of a signal on line 24, from the first to the second position, so that waste is introduced via the inlet 4 into the incinerator 2. Thereafter, the supply plate returns to the first position. Having returned to the first position, the supply plate can, if desired, move to the second position again to push more waste into the incinerator.

The incinerator is further provided with a chimney 26 as well as a schematically indicated steam generator 28 which utilizes the heat produced in the incinerator for generating steam.

In use, therefore, the incinerator is filled with waste by means of the supply plate 18. This waste is subsequently advanced slowly in the conveying direction by the conveying means 12. If the waste is disposed in the incinerator, adjacent the inlet, the waste will be heated up and evaporation will occur. The heat-up occurs partly in that with the aid of the air supply means 14 heated air is supplied and partly in that the incinerator, due to combustion of previously supplied waste, is already very hot. When the waste is further conveyed in the conveying direction, the waste reaches the so-called main burning zone. Here the combustible part of the waste will be burnt. Next, the waste will be conveyed further in the direction of the outlet 6. The fire will then go out slowly and there will be burnout. Eventually, the burnt waste will leave the incinerator via the outlet 6. Because the heating value of the waste can vary strongly, the heat production in the incinerator, and hence the generation of steam and the consumption of oxygen, can likewise vary strongly. To compensate the influence of a variable heating value of the waste, the system further comprises a first control means 30. The control means 30 is connected via a line 32 with the energy generator 28. The energy generator 28 generates on line 32 a signal that is a measure for the amount of energy that is generated by the energy generator 28. In this example, the energy generator consists of a steam generator and on line 32 a signal is generated which is a measure for the amount of steam generated. Further, utilizing a protective device 34, via line 36, a reference signal is applied to the first control means 30, which reference signal has a first value. This first value corresponds to the amount of steam which the steam generator 28 is supposed to generate. The control means 30 compares the signal $S_{32}$ on line 32 with the signal $S_{36}$ on line 36. If these signals correspond with each other, the steam generator 28 generates the predetermined amount of steam. However, when it is found that the generated amount of steam is smaller than the first value $S_{36}$ on line 36, the first control means 30 generates a first control signal $S_{38}$ on line 38. For the control signal $S_{38}$ it holds, for instance, $S_{38} = S_{36} - S_{32}$, so that $S_{38}$ is positive when less steam is generated than the first value. This control signal on line 38, in this example, is applied to the control unit 40. The control unit 40, when it is indicated on line 38 that the amount of steam that is produced is less than the first value on line 36, will, via line 24, control the supply plate 18, such that waste is supplied to the incinerator at an increased rate, with the result that per unit time more waste will be burnt and that therefore the steam production increases. Also, via line 42, the conveying speed of the waste through the incinerator can be raised. When it is subsequently found that the steam production has reached the first value, the signals on line 32 and 36 will become equal to each other again, so that the control signal on line 38 generated by the first control means 30 returns to zero. The control unit 40 presently knows that the steam production is back at the appropriate level again and, via line 24, will control the supply plate 18 such that it continues to supply waste to the incinerator at the increased rate. Also, because more waste is being supplied to the incinerator, the control unit 40 in this example will accordingly raise the speed of the conveying means 12 via line 42. Therefore, per unit time, more waste is passed through the incinerator and burnt.

When the heating value of the waste supplied to the incinerator increases, the signal on line 32 will indicate that the steam generator 28 generates correspondingly more steam. When thus more steam is being generated than corresponds with the predetermined first value on line 36, the first control means 30 will generate a signal, negative in this example, on line 38. In response, the control unit 40 will control the supply plate 18, such that per unit time less waste is supplied to the incinerator. Also, via line 42, the conveying speed of the waste through the incinerator will be reduced accordingly. These reductions will be carried out such that eventually on line 32 a signal is generated that corresponds to the first value on line 36. This means that in that case the amount of steam that is generated by the steam generator 28 is equal to the first value again.

In this example, the system further includes a second control means 44 which is connected via line 46 with an oxygen sensor 48 in the incinerator, which oxygen sensor 48 determines the amount of oxygen in the incinerator. The signal $S_{46}$ on line 46 is a measure for the amount of oxygen in the incinerator. The system further includes a second protective device 50, which applies a second value to the second control means 44 via line 52. The signal $S_{52}$ on line 52 is a measure for the second value. This second value denotes the amount of oxygen supposed to be present in the incinerator. When it is found, however, that in the incinerator more oxygen is present than is indicated on line 52 by the second value, the second control means 44 will generate on line 54 a signal $S_{54}$ which has as a consequence that the control unit 40 controls the air supply means via line 56, such that the amount of air that is supplied to the incinerator decreases. The signal $S_{54}$ is for instance equal to $S_{46}-S_{52}$ and hence positive when more oxygen is present than the second value. Such a situation can occur, for instance, when waste of a lower heating value is supplied to the incinerator. In that case, less oxygen is combusted, so that it is not necessary to supply an excess of air to the incinerator. When it is subsequently found that through a reduced supply of the amount of air the amount of oxygen in the incinerator decreases again to the second value on line 52, the second control means 44 in this example will generate a signal of the value zero on line 54. Given this signal, the control-unit 40 will maintain unchanged the amount of air that is supplied to the incinerator by means of the air supply means 14. Entirely analogously, the second control means 44 will provide that when the amount of oxygen in the incinerator falls below the second value, the amount of air that is supplied to the incinerator by means of the air supply means 14 is increased again, just so long until the amount of oxygen in the incinerator is equal to the second value again.

Figure 2:
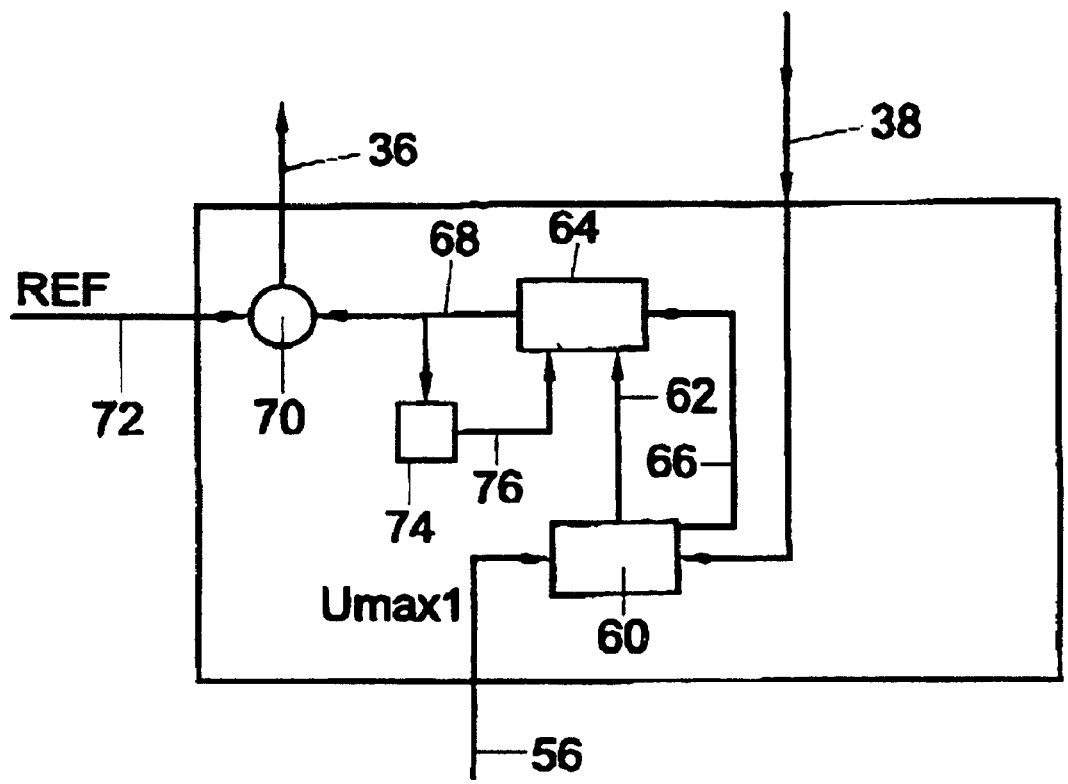
FIG. 2 shows a possible embodiment of the protective devices according to FIG. 1.

As appears clearly from FIG. 1, a control signal on line 38 is also supplied to the first protective device 34. The first protective device 34 is arranged such that it lowers the first value on line 36 when the control signal on line 38 exceeds a predetermined maximum value. This maximum value $U-max_1$ is supplied to the first protective device 34 via line 56. A possible embodiment of the protective device is shown in FIG. 2. The protective device of FIG. 2 includes a comparator 60 which compares the control signal $S_{38}$ on line 38 with the predetermined maximum value $U-max_1$. As long as the control signal $S_{38}$ on line 38 is less than $U-max_1$, the comparator 60 is inactive. However, when the control signal $S_{38}$ on line 38 increases and takes the value of $U-max_1$ and exceeds it, the comparator 60 will generate on line 62 a start signal that is applied to an integrator 64. The comparator 60 also generates on line 62 a signal $S_{62}=S_{38}-U-max_1$ which is equal to the difference between the control signal on line 38 and $U-max_1$ on line 56. In this example, therefore, this involves a positive difference. The integrator 64 begins to integrate this difference in time at the moment when via line 62 the start signal is applied to the integrator 64. Then, on line 68, a correction value $\Delta V$ which increases in time is generated. This correction value $\Delta V$ is applied to a difference former 70. The difference former 70 determines the difference ($ref_1-\Delta V$) between a reference value $ref_1$ applied to the difference former 70 via line 72 and the correction value $\Delta V$. The first value $S_{36}$ on line 36 is then equal to the reference value $ref_1$ on line 72 minus the correction value $\Delta V$ on line 68. As a consequence of all this, accordingly, as long as the control signal $S_{38}$ is smaller than $U-max_1$ on line 68 a signal is generated that has the value 0. The first value $S_{36}$ is then equal to the reference value $ref_1$. The reference value $ref_1$ then indicates the amount of steam that is to be generated by the steam generator. However, when the control signal 38 exceeds the value $U-Max_1$, as discussed above, on line 68 the integrator 64 will generate a correction value $\Delta V$ increasing in time. This correction value has as a consequence that the first value on line 36 is reduced by the correction value. In other words, the first value $S_{36}$ is made equal to the reference value minus the correction value $\Delta V$. The result is that presently the steam generator is expected to generate an amount of steam that corresponds to a reduced first value ($ref_1-\Delta V$). The reduced first value will gradually decrease in time in connection with the fact that the integrator 34 integrates the difference between the control signal $S_{38}$ on line 38 and $U-max_1$ on line 56 in time. When the production of the steam generator becomes equal to the reduced first value in that the reduced first value has decreased sufficiently (the so-called setpoint has been lowered sufficiently), this will have as a consequence that the control signal $S_{38}$ on line 38 will fall below the value $U-max_1$ again. This in turn has as a consequence that the sign of the output signal $S_{62}=S_{38}-U-max_1$ of the comparator 60 on line 62 inverts and thus becomes negative. The signal on line 62 will cause the correction value $\Delta V$ on line 68 to decrease again, since the integrator 64 presently continues to integrate on the basis of a negative signal presented via line 62 to the input of the integrator 64. As a result, the lowered first value ($ref_1-\Delta V$) will increase again. The first control means 30 is further provided with a zero-axis crossing detector 74. When the zero-axis crossing detector 74 detects that the correction value $\Delta V$ on line 68 decreases to the value 0, it will generate a stop signal on line 76, so that the integrating operation of the integrator 64 is stopped. It then holds that the correction value on line 68 is, and remains, equal to 0, so that the first value $S_{36}$ on line 36 is no longer reduced and is equal to the reference value $ref_1$. The situation is then normal again and the protective device will subsequently ensure that the first value is unlowered and remains equal to the reference value, until the control signal on line 38, for whatever reason, exceeds the value of U-max, again. Thereupon the whole cycle will repeat itself again. The result of the fact that the full power drive of the control signal $S_{38}$ on line 38 is limited to $U-max_1$ is that thus a situation is prevented where, given, for instance, a lower heating value of the waste, in response thereto increasingly more waste will be supplied to the incinerator, with the result that the incinerator may even go out. This is prevented by temporarily settling for a lower steam production, until the heating value of the waste makes it possible again to produce more steam.

In this example, the system further comprises a second protective device 50, which is wholly identical and functions wholly identically to the first protective device 34, except that unit 70 is presently an adder instead of a difference former. In normal operation, the second value $S_{52}$ on line 52 will be equal to the second reference value $ref_2$ which is supplied via line 80 to the second protective device 50. When by means of the sensor 48 it is established that the amount of oxygen in the incinerator is above the second value (which in this example is equal to the second reference value on line 80), the second control means 44 will generate a positive control signal $S_{54}=S_{46}-S_{52}$ on line 54. This positive control signal on line 54 is also applied to the control unit 40, which, in response thereto, will reduce the amount of air that is supplied via the air supply means 14, and/or increase the amount of waste that is supplied to the incinerator by means of the supply plate 18, since an increased amount of oxygen in the incinerator allows more waste to be burnt and/or less air to be supplied. Here, too, it holds that when the control signal on line 54 exceeds a predetermined maximum value U-max$_2$ on line 82, the second protective device 50 will, entirely analogously, cause the second value on line 52 to be increased by a correction value $\Delta V_2$, in such a manner that the second value on line 52 is equal to the second reference value increased by the correction value $(ref_2+\Delta V_2)$. In a manner entirely analogous to that discussed above, the second value $(ref_2+\Delta V_2)$ on line 52 will decrease again to the second reference value on line 80 from the moment that the output signal on line 54 has fallen below the second maximum value U-max$_2$ again. When the correction value of $\Delta V_2$ has decreased to zero, the second value will take, and continue to take, the value of $ref_2$, until the control signal on line 58 exceeds the value U-max$_2$ again.

The invention is not limited in any way to the embodiment outlined hereinbefore. Thus, the first and second control means, the first and second protective device, and the control unit 40 can be realized by a computer 84 loaded with the appropriate software, as is indicated in FIG. 1. Also, the control unit 40 may consist of two discrete control units 40A and 40B. In that example, control unit 40A generates the signal on line 56 on the basis of signal $S_{54}$ and control unit 40B generates the signals $S_{24}$ and $S_{42}$ on the basis of signal $S_{38}$.

It is also possible that the control unit generates the signals $S_{24}$, $S_{42}$, and $S_{56}$ on the basis of the second control signal $S_{54}$. For when the second control signal $S_{54}$ indicates that more oxygen is present in the incinerator than the second value, then, in addition to, or instead of, lowering the air supply, also the amount of matter that is supplied to the incinerator can be increased and optionally also the conveying speed of the matter in the incinerator can be raised, so that, according to expectations, the amount of matter that is burnt will increase, as a result of which the amount of oxygen in the incinerator will decrease again. Now, too, it holds that the second protective device ensures that the second control signal. cannot exceed the value U-max$_2$ without limitation, thereby preventing an unlimited increase of the amount of matter that is supplied to the incinerator and of the conveying speed in case of an excess of oxygen in the incinerator.

It is also possible that the control unit processes the first and second control signal in combination, for instance by adding up the control signals $S_{38}$ and $S_{54}$ to form a total signal $S_{tot}=S_{83}+S_{54}$. The control unit can then, in case of a rising/falling value of $S_{tot}$ increase/reduce the supply of the amount of matter via line 24, and/or increase/reduce the conveying speed of the matter in the incinerator via line 42 and/or reduce/increase the air supply.

For each of the above-outlined embodiments and operation of the control unit 40, 40A, 40B, it holds that in practice the protective device 30 can properly suffice and that the protective device 44 can be omitted. Such variants are all understood to fall within the scope of the invention.

What is claimed is:

1. A system for continuous thermal combustion of matter such as waste, comprising an incinerator including an inlet for supplying matter to be combusted, an outlet for discharging combusted matter, a combustion path extending between the inlet and the outlet and along which, in use, by means of conveying means the matter is continuously passed in a conveying direction from the inlet to the outlet for combustion of the matter, and air supply means for supplying optionally heated air to the combustion path, the system further comprising an energy generator for generating energy in the form of, for instance, steam or electricity on the basis of heat generated in the incinerator, and control means which, depending on the amount of energy generated by the generator, and/or the amount of oxygen in the incinerator, generates at least one control signal for at least setting the amount of matter which is supplied to the incinerator and/or the speed at which the matter is conveyed in the conveying direction through the incinerator, and/or the amount of air which is supplied to the incinerator by means of the air supply means, the control means controlling the at least one control signal such that by the energy generator an amount of energy per unit time is generated which is at least equal to a first value and/or that an amount of oxygen is present in the incinerator which is at most equal to a second value, characterized in that the system further comprises at least one protective device which lowers the first value or the second value and/or raises the second value when the at least one control signal exceeds a predetermined maximum value.

2. A system according to claim 1, characterized in that the protective device comprises an integrator which starts to integrate the difference between the at least one control signal and the predetermined maximum value in time from the moment that the value of the at least one control signal rises such that it becomes greater than the predetermined maximum value, the protective device being arranged to lower the first value by a correction value whose magnitude depends on the magnitude of the output signal of the integrator, or to raise the second value by a correction value whose magnitude depends on the magnitude of the output signal of the integrator.

3. A system according to claim 2, characterized in that the correction value is directly proportional to the magnitude of the output signal of the integrator.

4. A system according to claim 2, characterized in that the protective device is so arranged that when the magnitude of the control signal falls below the predetermined maximum value again while the correction value is not yet equal to zero, the integrating operation of the integrator is continued on the basis of the inverse of the difference between the magnitude of the value of the control signal and the magnitude of the predetermined maximum value until the correction value is equal to zero.

5. A system according to claim 1, characterized in that only one protective device is present for lowering the first value.

6. A system according to claim 1, characterized in that the control means and the at least one protective device comprises a computer.

* * * * *